United States Patent [19]

Appelblatt et al.

[11] 4,158,986
[45] Jun. 26, 1979

[54] ARMORED VEHICLE

[75] Inventors: Irving Appelblatt, West Bloomfield; Theodore A. Jackson, Utica; James D. Crabtree, St. Clair Shores; Peter Krawiecki, Utica, all of Mich.

[73] Assignee: Cadillac Gage Company, Warren, Mich.

[21] Appl. No.: 842,214

[22] Filed: Oct. 14, 1977

[51] Int. Cl.² ............................................. F41H 7/02
[52] U.S. Cl. ................................................... 89/36 H
[58] Field of Search ............................. 89/36 H, 40 B

[56] References Cited

U.S. PATENT DOCUMENTS

| | | | |
|---|---|---|---|
| 1,276,444 | 8/1918 | Taylor | 89/40 B |
| 1,438,878 | 12/1922 | Tomassette | 89/40 B |
| 1,696,439 | 12/1928 | Knox | 89/40 B |
| 1,836,446 | 12/1931 | Christie | 280/666 |
| 1,837,013 | 12/1931 | Brown | 280/666 |
| 1,975,794 | 10/1934 | Knox et al. | 89/36 H |
| 2,011,565 | 8/1935 | Barnes | 89/40 B |
| 2,760,787 | 8/1956 | Muller | 280/696 |
| 3,024,704 | 3/1962 | Even | 89/36 H |
| 3,266,591 | 8/1966 | Sampietro et al. | 180/44 R |
| 3,876,229 | 4/1975 | Kohn et al. | 280/152 R |

FOREIGN PATENT DOCUMENTS

| | | | |
|---|---|---|---|
| 2162116 | 6/1973 | Fed. Rep. of Germany | 89/36 H |
| 858036 | 11/1940 | France | 89/40 B |
| 1522614 | 4/1968 | France | 89/36 H |

Primary Examiner—Stephen C. Bentley
Attorney, Agent, or Firm—Krass & Young

[57] ABSTRACT

An armored wheeled vehicle configured for maximum resistance to penetration by frontally directed weapons fire while affording excellent visibility at the driver station and an extended field of fire for the weapon observation station, having an armored hull with an extended upper oblique frontal surface, sloping to a point rearward of the midpoint of the vehicle. The driver station is located approximately at the midpoint of the vehicle with the sloping frontal surface affording good visibility for the driver and includes a driver's hatch positioned over a driver station hull opening, the hatch adapted to be moved down and forwardly to provide an unobstructed driver view. The armament observation station is located to the rear and above the driver station, while the vehicle power plant is located along side the driver station. The front suspension includes a trailing arm type suspension minimizing the hull depth at the front wheels to allow the oblique frontal surface to be extended. The front wheel assemblies are disposed within wheel wells recessed within each side of the hull and covered by displaceable fairing panels which are normally disposed and overlie the wheel wells to provide an upper surface in conformity with the frontal surface of the hull.

19 Claims, 7 Drawing Figures

ARMORED VEHICLE

BACKGROUND DISCUSSION

In the design of armored vehicles, the resistance to penetration by ballistic impact is obviously of uppermost concern. Most military armored vehicles are intended to be utilized for offensive or reconnaissance purposes or emplaced defensive positions, all of which allow the assumption that the weapons fire will be directed at the frontal areas of the vehicle. The ballistic protection is thus attemped to be maximized at the frontal regions of the vehicle.

The major factors in the effectiveness of the armor in resisting penetration are thickness and the obliquity with which the projectile impact occurs. The thickness is arrived at by a weight versus performance compromise.

The obliquity of the frontal surface is sought to be maximized since the effectiveness of a given thickness is rendered much greater with increasing angles of impact, sloping surfaces tending to produce a thicker effective surface which must be penetrated in order to breach the armor.

Most armored vehicles are constructed with a unitary hull which may be formed from a casting in the case of heavy tanks, or alternatively a weldment of armor plate for more lightly armored vehicles. The hull has mounted to it a weapons-observation station most typically comprised of a separate turret structure which generally serves the purpose of providing offensive/defensive weaponry for the vehicle and a reconnaissance-observation point. The hull serves to house the functional components and generally the driver station and accordingly the envelope defined by the enclosed space within the hull, in some respects, is dictated by the need to house these functional components within its interior. The obliquity of the frontal surfaces of the hull are partially defined by the design objective of maximum obliquity and partially by the need to house the various functional components in a manner allowing them reasonably effective functioning.

Ideally, the hull should be configured to efficiently house the vehicle components, personnel and equipment without any additional hull structure incorporated solely as armor, since an excessive weight penalty would thereby be imposed.

In the case of wheeled armored vehicles, a major constraint has been imposed by the need for good driver visibility and the hull depth which is required to accommodate the front suspension system, this latter factor, particularly with high performance vehicles, requiring considerable suspension travel in order to negotiate rugged terrain at high speeds.

The corresponding wheel travel also presents a potential obstruction interfering with proper driver visibility if the driver were placed to the rear of the front suspension system.

Accordingly, the conventional practice has been to provide the location of the driver station in a forward location approximately even with or just behind the front wheels, requiring a considerable hull depth in this region to accommodate the driver. Since the hull should not extend too far forwardly of the front wheels to avoid an undue weight penalty, the hull configuration has included a frontal surface sharply tapering to a full hull depth at the driver station located in the forward region of the vehicle hull.

It is an object of the present invention to provide an armored wheeled vehicle in which the various functional components are arranged in such a way as to efficiently house the vehicle components and allow an extended oblique surface from the forward hull edge to a point beyond the midpoint of the vehicle such that a very shallow slope angle of the surface may be provided to maximize the resistance of the front of the hull to penetration by ballistic impact.

It is a further object of the present invention to provide such a hull configuration which does not significantly compromise the field of view of the driver and which enhances the field of fire and view at the weapon-observation station.

It is yet another object of the present invention to provide an armored wheeled vehicle configuration in which the driver visibility is not hindered by the front suspension system or by the need for the hull to accommodate the full wheel travel such that a high performance armored vehicle having a large front wheel displacement be provided while minimizing the hull depth required to accommodate such suspension.

SUMMARY OF THE INVENTION

These and other objects of the present invention, which will become apparent upon a reading of the following specification and claims, are accomplished by a configuration in which the hull upper front surface slopes obliquely back to a point beyond the midpoint of the vehicle, with the driver station located in the middle of the vehicle. The extended sloping frontal surface affords good visibility for the driver.

The vehicle power plant is located approximately along side the driver's station and includes a folded engine-transmission unit which drives both the front and rear wheels of the vehicle. A weapon-observation station is provided to the rear and above the driver station at the point of maximum vehicle depth such that the overall slope is generally continued from front to rear and the field of fire and view also enhanced by the sloping upper surface.

A trailing arm suspension system utilizing compression springs extending into the hull nose as well as a displaceable wheel well fairing panel are utilized to minimize the hull depth required to house the suspension and to eliminate the need to enclose the wheels throughout their full extent of movement. The upper sloping hull surface also enables the use of a driver hatch which is moved forwardly and downwardly out of the driver's line of sight in the open position.

A rear entry door is provided allowing for exit of the vehicle under cover of the vehicle itself. The vehicle hull is further provided with a sloping lower front side and rear surfaces which extend from a peripheral edge extending about the vehicle perimeter.

DETAILED DESCRIPTION

Figure 1:
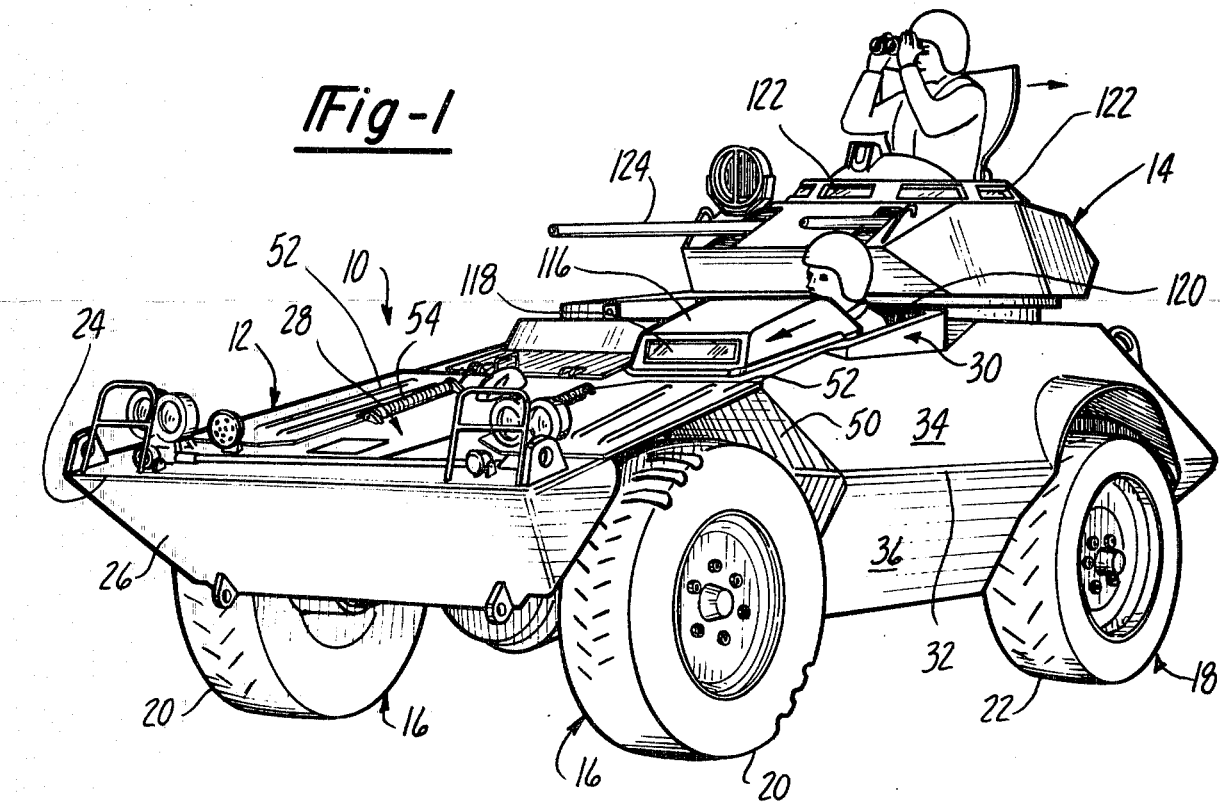
FIG. 1 is a perspective view of an armored vehicle according to the present invention with the driver and turret hatches open.

In the following detailed description, certain specific terminology will be utilized for the sake of clarity and a specific embodiment described in accordance with the requirements of 35 USC 112, but it is to be understood that the same is not intended to be limiting and should not be so construed inasmuch as the invention is capable of taking many forms and variations within the scope of the appended claims.

According to the concept of the present invention, the major components of the armored vehicle are arranged so as to maximize the efficient enclosing of the vehicle and to minimize the vulnerability of the hull to weapons fire without compromising the operation effectiveness of the vehicle in the sense of unduly limiting driver visibility or the field of fire or view at the weapon-observation station. Indeed the effectiveness in enhanced by the resulting configuration which allows efficient use of armor such as to optimize the overall balance of the design objectives as to armor protection, weight and performance.

In general terms, this concept calls for the driver station to be located approximately at the midpoint of the vehicle with the hull upper front surface sloping up from the minimum hull depth at the front of the vehicle extending in a gradual oblique angle behind the driver station to the rear of the midpoint of the vehicle hull. The sloping surface provides a very shallow oblique angle due to the relatively great hull length over which the hull depth transitions to the depth at the driver station. A driver's hatch is provided which is moved forward downwardly out of the line of sight of the driver in the open position and is moved to the closed position to present a similarly inclined oblique surface to frontally directed fire. The power plant is located along side the driver station comprising a side-by-side engine-transmission which drives a transfer case which in turn provides power to the front and rear wheel assemblies via longitudinally extending drive shafts.

A trailing arm suspension system for the front wheels coupled with displaceable fairing panels covering the front wheel wells permits a relatively narrow depth of the hull at the region of the front wheels consistent with the extended upper surface.

The weapon-observation station is located to the rear of the driver station and above the level of the hull such that the maximum vehicle depth is at the rearmost region of the vehicle in conformity with the upper oblique slope presented by the vehicle. The downwardly sloping surfaces presented to the front of the weapon-observation station provide a clear field of view for both observation from the armament station and also maximum field of fire for the armament carried by the weapon station.

Referring then to the drawings, which illustrate the particularly embodiment of the concept of the present invention, the vehicle is shown as a wheeled armored vehicle 10 including a hull 12 and a turret 14.

The armored vehicle 10 depicted is a four-wheel drive vehicle having front wheel assemblies 16 and rear wheel assemblies 18, each of said wheel assemblies 16 and 18 including heavy-duty military tires 20 and 22.

Each of the front and rear wheel assemblies 16 and 18 are supported by means of an extended travel suspension system to be described briefly hereinafter which serves to support the weight of the vehicle on the wheel assemblies 16 and 18.

The vehicle hull 12 is configured with a leading edge 24 extending across the front of the vehicle with the hull sloping away from the leading edge 24 both downwardly and upwardly. The lower sloping surface 26 terminates just forward of the front wheel assembly 16, while the upper gradually sloping surface extends rearwardly a distance beyond the midpoint of the vehicle 10 such that a very gradual slope is possible due to the relatively great proportion of the vehicle length over which the hull depth transistions to that existing at the midpoint of the vehicle. This angle can thus be on the order of 10° from the horizontal.

The hull depth at this point is adequate for the positioning of the driver station indicated generally at 30. The hull 12 is also formed with lateral edges 32 on either side of the vehicle, with upper sloping surfaces 34 on either side and lower sloping surfaces 36 extending inwardly from the lateral edges 32.

The distance that such surfaces extend before reaching full hull depth is obviously much shorter than the front deck and accordingly the obliquity of these surfaces is not nearly so shallow. However, as noted above, the region of greatest vulnerability is the upper front surfaces of the vehicle. The depth of the hull is thus maximum intermediate the sloping surfaces 34 and 36 and at the rearmost region of the sloping upper surface 28. Alongside the driver station 30 is located the vehicle power plant 88 (FIG. 7) to likewise take advantage of and occupy the hull depth at this region. The intake air and exhaust grids 38 are provided over the power plant location.

To the rear of the power plant 88 and driver station 30 is provided the weapon-observation station which typically is provided by a turret 14, although various configuration weapon-observation stations can be provided depending on the particular mission for which the vehicle is intended. The weapon-armament station extends above hull 12 over the driver station 30 as shown such that the overall vehicle depth in this region is at a maximum.

It can thus be appreciated that by this overall configuration that the enclosed space defined by the hull 12 is most efficiently utilized which allows over one-half the vehicle length for achieving a transition from the minimum hull depth at the front to the full hull depth at the driver station 30 which thus allows maximum penetration resistance of the upper front surfaces to frontally directed weapons fire.

At the same time, this extended obliquity of the upper surface 28 affords the driver good visibility to the front even though he is positioned well back within the vehicle.

The weapon-observation station defined by the turret 14 is also thereby afforded an unobstructed view, both for observation and also for directing of the weapon fire. Its depth is somewhat greater than the maximum hull depth, such that the overall general contours of the vehicle 10 slope from the leading edge all the way to the peak of the turret 14 such as to provide the overall optimum configuration for efficient utilization of the vehicle armor. The rear surface 38 likewise slopes back from the outer perimeter edge defined by the leading sharp edge 24 and the lateral edges 32 and similar rear edge 40 such that the upper rear surface 38 slopes upwardly to the peak of the hull 12 and the lower surface 42 slopes downwardly to the bottom of the hull 12.

A rear exit door 44 is provided which may be of a height approaching the full hull dimension as shown to provide easy ingress and egress, and ready access for the loading and unloadong of the equipment, ammunition, etc. and for emergency exit under the cover afforded by the vehicle 10.

Referring to the major components in further detail, the hull 12 is provided with front wheel wells 50 which are recessed into the sides of the hull 12, with the front wheel assemblies 16 received within these recesses to provide protection for the same. As will be described, the front suspension system is adapted to accommodate extended wheel travel and accordingly the wheel wells 50 are not intended to accommodate the entire extent of travel. Rather, the wheel wells 50 open on the upper surface 28 of the hull 12, with these openings overlain by displaceable fairing panels 52.

This arrangement is described and claimed in further specificity in copending patent application Ser. No. 842,216, filed Oct. 14, 1977, assigned to the assignee of the present application.

Each of the fairing panels 52 is biased to the closed position by means of torsional wind up springs 54 which urge the fairing panels 52 to lie flat in conformity with the upper surface 28 as shown in these Figures.

Upon extended travel of the front wheel assemblies 16 causing contact of the tires 20 with the underside of the fairing panels 52, the fairing panels 52 are displaced about a pivotal hinge 56 allowing pivoting movement of the fairing panels 52, to allow the wheel assemblies 16 to travel above the level of the upper surface 28.

Thus, under normal circumstances, the upper surface 28 is unobstructed by wheel well covers, with the shallow oblique angle of the upper surface 28 allowing ready visibility from the driver station 30 over the fairing panel 52. Since only occasionally would the fairing panels 52 be displaced upwardly, their movements would not create significant visual obstruction.

As indicated, the suspension system for the present vehicle is contemplated as being of a design which utilizes a minimum hull depth in order to be accommodated. This suspension system is described and claimed in greater detail in copending application Ser. No. 842,213. filed Oct 14. 1977, and provides a rugged but simple suspension system which is capable of accommodating extended travel of the front wheel assemblies 16 in a rather confined hull space. A detailed description is not here included, since the details of that suspension system do not comprise the present invention and are not necessary for a proper understanding of the present invention.

Figure 4:
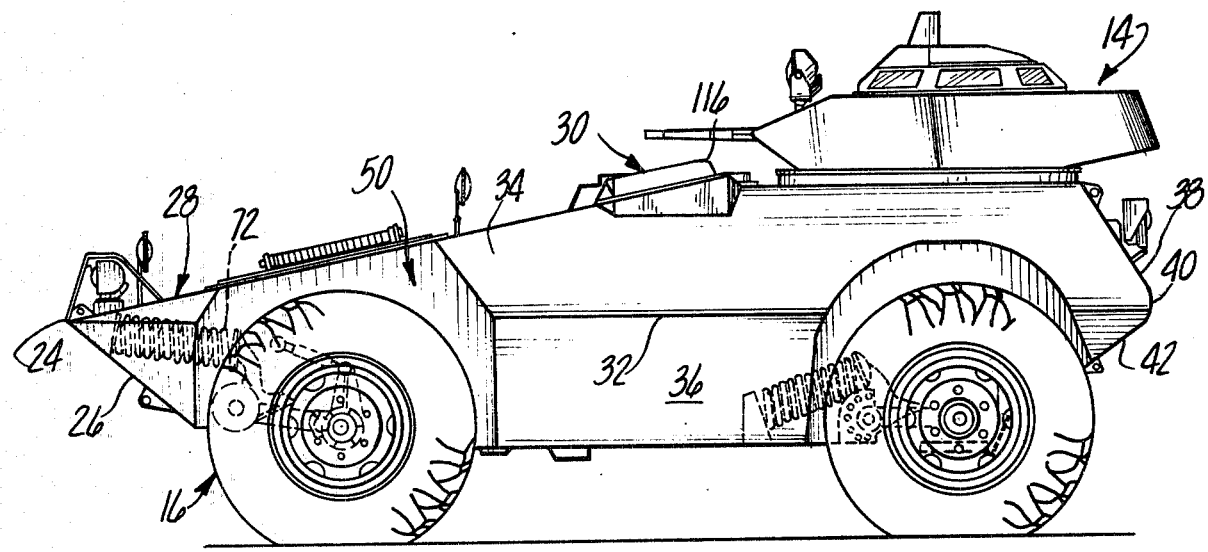
FIG. 4 is a side elevational view of the armored vehicle shown in FIGS. 1 through 3 depicting in outline form the major components of the vehicle suspension system.
Figure 5:
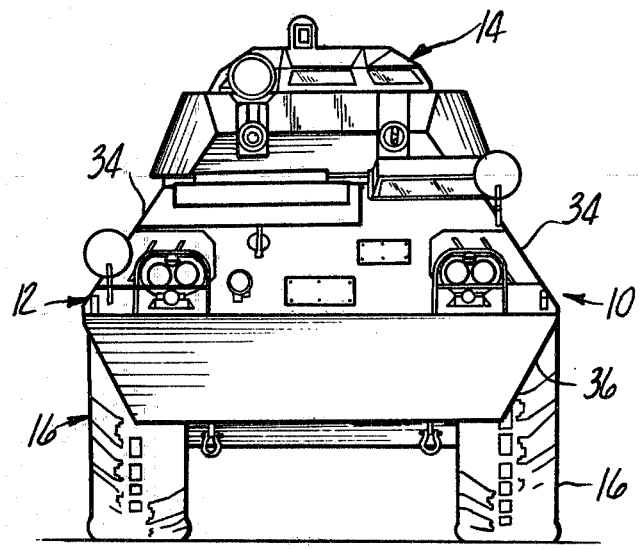
FIG. 5 is a front elevational view of the vehicle shown in FIGS. 1 through 4.
Figure 6:
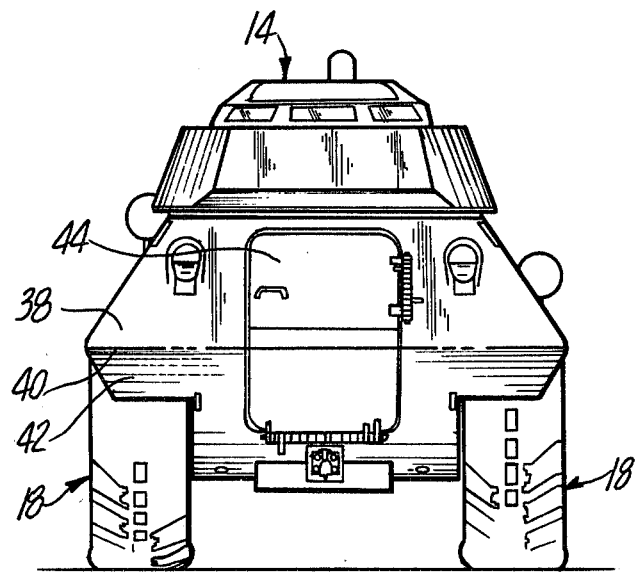
FIG. 6 is a front elevational view of the vehicle shown in FIGS. 1 through 5.
Figure 7:
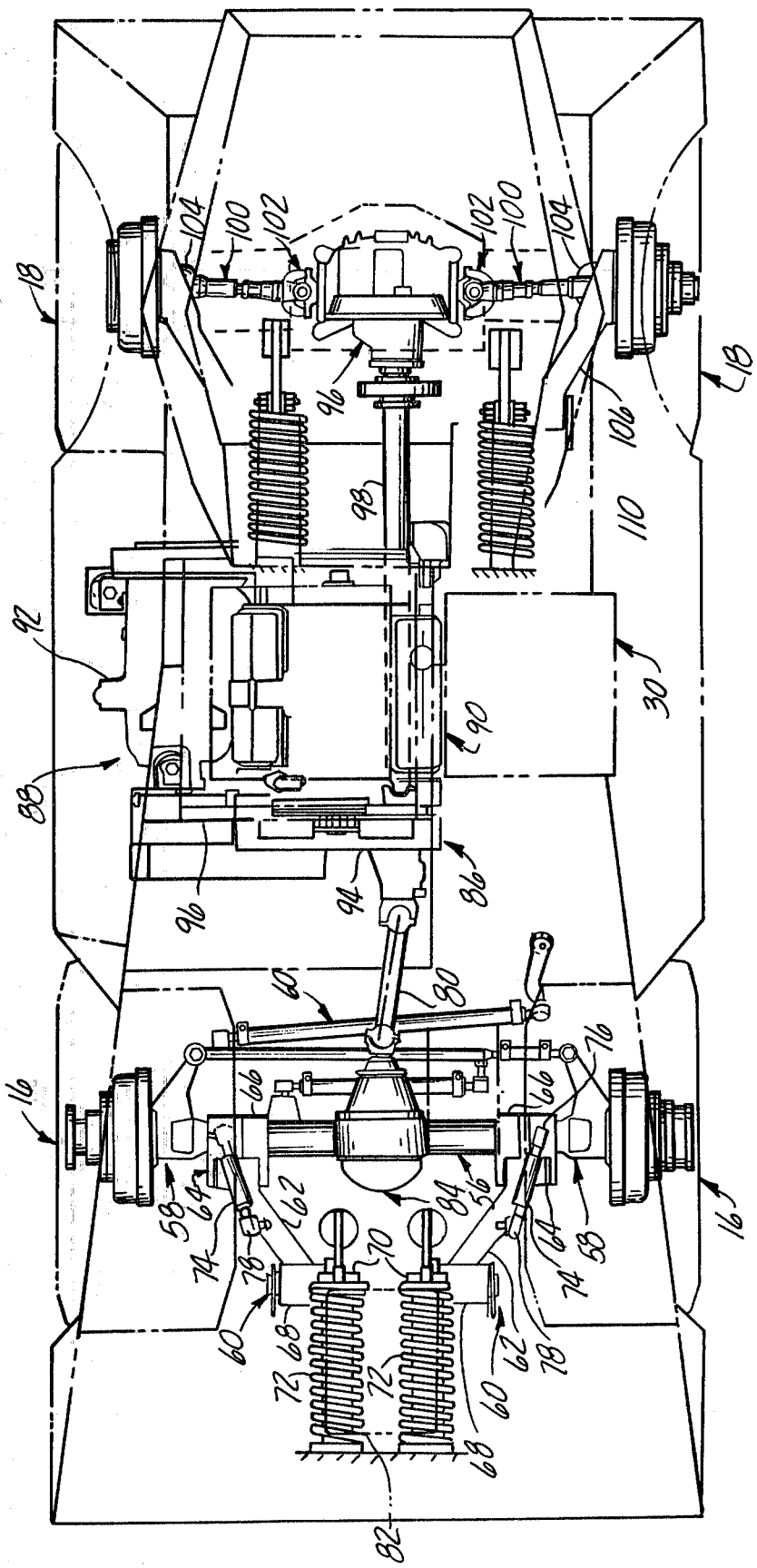
FIG. 7 is a plan view of the outline of the vehicle hull and turret structure with the major power train components depicted.

The major components of this suspension system are depicted in FIGS. 4 and 7. The front suspension includes an axle housing 56 extending from side to side under the hull 12 (FIG. 7) with the wheel assemblies 16 mounted to pivotal housings 58 pivotally mounted onto opposite ends of the axle housing 56. The pivotal housings 58 accommodate steering movements controlled by the steering gear 60.

Each end of the axle housing 56 is supported by means of bell crank assemblies 60 located at either end of the axle housing 56. Each of the bell crank assemblies 60 includes a trailing arm 62 pivotally mounted at one end to the axle housing at 64 to a bracket 66 welded to the axle housing 56. Each of the tilting arms 62 is pivotally mounted at the other end 68 to the vehicle hull 12 with a crank arm 70 provided of a shorter effective length than the trailing arm 62, each which acts on a coil spring 72 such as to cause compression of the coil spring 72 upon rotation of the trailing arm 62 upwardly in response to encountering of terrain features by a respective front wheel assembly 16.

A pair of constraining rods 74 are also provided, each pivotally connected at one end 76 to the axle housing and to the other end 78 to the vehicle hull 12 such as to constrain the motion of the axle housing 56 on the trailing arms 62 such as to maintain the attitude of the axle housing 56 in order to maintain a proper attitude with the steering gear 60 as well as a reasonable inclination with respect to the drive shaft 80. The coil springs 72 extend horizontally and forwardly into the nose of the hull 12, as shown in FIG. 4. This arrangement, together with the shorter length of the crank arms 70, requires a relatively small space in order to accommodate the coil spring 72, while at the same time, they are able to absorb a considerable travel of the front wheel assemblies 16. The hull depth with the horizontally extending coil springs 72 is minimal and the forward hull space is thus utilized efficiently.

An access panel 82 is provided for the closely spaced coil springs 72 such as to allow ready servicing of the various moving parts.

The front wheel assemblies 16 are contemplated as being driven by a conventional differential gear unit, indicated generally at 84, housed within the axle housing 56 with a pair of axle shafts extending to the opposite ends of the axle housing 56 and drivingly engaged with each wheel assembly by means of universal joints and stub shafts contained withih the pivot housing 58 (not shown).

The differential gear unit 84 is driven by the drive shaft 80 extending from a transfer case 86. The engine power plant 88 includes the vehicle engine 90 and transmission 92 in a side-by-side relationship located approximately along side the driver station 30. A transfer case 94 driven by the transmission 92 by means of a belt drive 96 powers the drive shaft 80 driving the front differential unit 84 as well as driving a rear differential gear unit 96 by means of a second drive shaft 98 driven by the transfer case 86.

The folded or side-by-side relationship of the engine-transmission utilizes the space alongside the drive station 30 efficiently and compactly while allowing relatively direct drives to the front and rear differential units 84 and 86, respectively.

The rear suspension is not required to enable steering of the wheel assembly 18 and utilizes an independent suspension system comprising a pair of axle shafts 100, each driving a rear wheel assembly 18 via universal joints 102 and 104 at either end. Each of the wheel assembly mounting structures is pivotally supported on bell cranks, each comprised of a trailing arm 106 which acts on a crank arm 108 to compress rear coil springs 110. The rear wheel assemblies are received within rear wheel wells 111 recessed into the hull sides.

Figure 3:
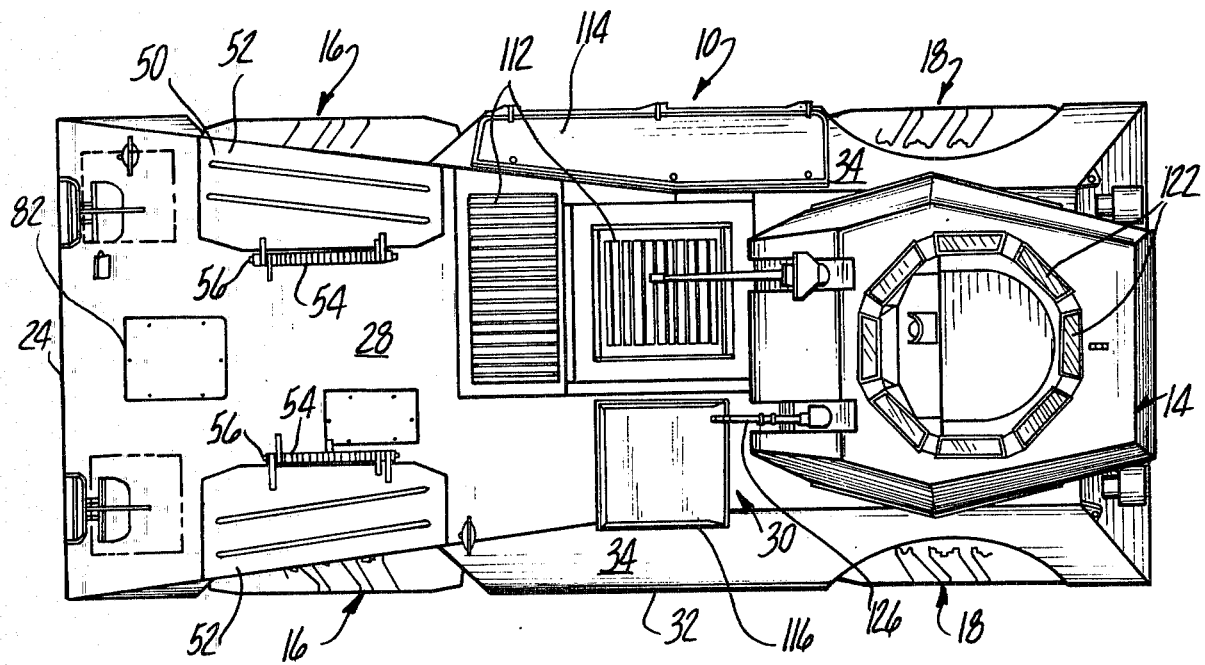
FIG. 3 is a plan view of the vehicle shown in FIGS. 1 and 2.

Engine exhaust and intake vents 112 are provided in order to allow proper cooling and exhaust of the engine power plant 88. Side access panel 114 is provided, as shown in FIG. 3, sloping at the same angle of lateral surface 34 and providing ready access to the power plant for service and maintenance on the function.

The driver station 30 would include suitable controls and vertically displaceable seats to properly position the driver for "buttoned up" and hatch open conditions. The driver staton 30 advantageously includes an integral vision block and hatch combination 116, the sloping upper surface 28 allowing the hatch 116 to be slid upwardly and downwardly in the hatch open position as shown in FIG. 1.

The driver's vision block, which by conventional design is provided in a separate opening in the hull, is rather incorporated in the hatch 116 to simplify the structure and enable straight down and away opening movement. The hatch details and the guide means for acting the hatch 116 in moving the same between the open and closed positions, is the subject matter of co-pending application Ser. No. 842,215, filed Oct. 14, 1977, assigned to the assignee of the present application.

The hatch 116 is adapted to cover the driver hull opening 120 to allow the driver good field of view during operations conducted in the presence of weapons fire and allow quick buttoning up of the armored vehicle 12 for operation with the hatch 116 covering the opening 120. The shallow angle of the upper surface 28 allows relatively easy handling of the weight of the hatch 116 and allows sufficient room in front of the hatch vision block to allow the hatch 116 to be slid downwardly out of the way so that the driver may have a good field of view downward over the top of the hatch 116 relative conventional design.

The hatch 116 in both the open and closed positions still presents a relatively oblique surface to the front enhancing the overall resistance to ballistic impact.

Figure 2:
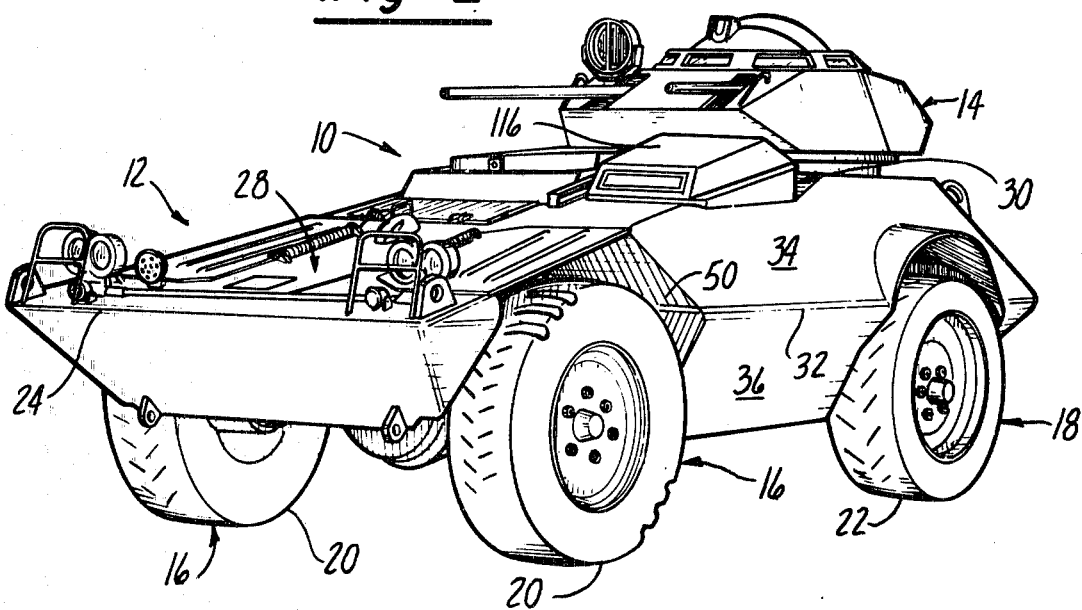
FIG. 2 is an armored vehicle according to the present invention shown in perspective in the buttoned up or hatch-closed condition.

The turret 14 similarly includes a viewing block 122 about its periphery and also typically includes an armament such as a heavy cannon or machine gun indicated at 124 extending from the hull turret 14. Various light weaponry such as a machine gun 126 will be provided on the driver side as indicated in FIG. 3. A turret hatch 128 shown open in FIG. 1 and closed in FIG. 2 allows observation from the highest point of the vehicle 10.

Accordingly, it can be seen that this configuration of the armored vehicle 10 is thus optimal insofar as tis resistance to penetration by ballistic impact. This configuration is further enhanced by the design of the front suspension and wheel wells which require minimum hull depth in the region of the front wheels. The hull configuration is taken advantage of by the hatch design in which the hatch cover containing the vision block is simply slid forward and down and away from the driver to allow a relatively simple structure. The location of the driver station at the midpoint as well as providing the power plant at this location allows the continuous sloping of the oblique front surface 28 at a very shallow angle. The positioning of the turret 14 at the rearmost section of the armored vehicle 10 creates a vehicle profile which is one of a gradually sloping obliqueness from the forward end of the vehicle. This maximum depth at the very rear of the vehicle allows relatively high height of the rear exit door 44 for exiting under maximum protection afforded by the vehicle itself.

This has been accomplished without significantly compromising the driver's field of view or the vision at the armament station or the field of fire allowed by the weaponry located at the armament staton. At the same time, the envelope defined by the vehicle hull efficiently encloses the vehicle components such that a very good balance between the weight and the armor protection is achieved.

While a particular embodiment has been described, it should be understood that many variations in the details can be made within the scope of the appended claims.

The embodiments of the invention in which an exclusive property or privilege is claimed are defined as follows:

1. An armored vehicle comprising:
   a vehicle hull constructed of an armor material defining an enclosed space, said vehicle hull having a front end, a rear end and lateral sides, and a sloping front upper surface extending from the front end of said vehicle hull;
   a pair of front wheel assemblies located on either side of said armored vehicle hull at the front of said vehicle hull disposed in recessed wheel wells extending laterally into said hull and opening onto said front upper surface of said vehicle hull;
   front suspension means supporting the front of said hull on said front wheel assemblies for up and down travel through said recessed wheel wells;
   a pair or rear wheel assemblies located on either side of said vehicle hull;
   rear suspension means supporting said rear wheel assemblies on the rear portion of said armored vehicle hull;
   a vehicle power plant and drive means providing a driving connection to at least one of said front or rear wheel assemblies to thereby power said armored vehicle;
   steering means for creating steering movement of said front wheel assemblies to thereby produce steering of said armored vehicle;
   a driver station located in said enclosed space defined by said vehicle hull located approximately midpoint in said armored vehicle hull between said front and rear wheel assemblies and on one side of said vehicle hull behind one of said front wheel recesses, said driver station means allowing driver visibility towards the front of said vehicle;
   said armored vehicle hull front upper surface extending from said front end of said vehicle hull and sloping upwardly to a point approximately even with said driver station whereby said vehicle hull length from said front end of said vehicle to said point substantially intermediate said front and rear wheel assemblies extends obliquely to thereby increase the penetration resistance of said frontal upper surface area to ballistic impact.

2. The armored vehicle according to claim 1 wherein said engine power plant is located within said enclosed space defined by said armored vehicle hull at a position alongside said driver station.

3. The armored vehicle according to claim 1 further including a weapon-armament station mounted to said vehicle hull at a point located to the rear of said driver station and extending above said level of said vehicle hull at said driver station.

4. The armored vehicle according to claim 3 wherein said weapon-observation station includes a turret mounted to said vehicle hull and extending above said hull level at said driver station, said turret including a weapon mounted to said portion of said turret structure extending above said hull and adapted to direct fire to the front of said vehicle.

5. The armored vehicle according to claim 1 wherein said vehicle hull further includes a lower sloping surface extending downward from said frontal edge of said vehicle hull.

6. The armored vehicle according to claim 5 further including upwardly and downwardly sloping surfaces formed along the sides of said vehicle hull from an outer edge substantially in line with said frontal edge of said vehicle hull.

7. The armored vehicle according to claim 6 wherein the rear of said vehicle hull is formed with upwardly and downwardly sloping surfaces extending from a rearmost edge substantially in line with said outer and forward edges of said vehicle hull.

8. The armored vehicle according to claim 1 further including displaceable fairing panels, means mounting said displaceable panels over said recessed wheel wells so as to conform to said sloping upper surface and further including means allowing displacement of said panels against a restoring force upon contact by said front wheel assemblies.

9. The armored vehicle according to claim 1 wherein said vehicle hull is formed with a rear exit opening formed in said rear portion of said vehicle hull.

10. The armored vehicle according to claim 1 wherein said driver station viewing means comprises a hatch opening formed in said vehicle hull, a displaceable driver hatch, means mounting said driver hatch over said driver station so as to be displaceable forwardly and downwardly over said upper surface of said hull, whereby said driver may view towards the front of said vehicle over said viewing hatch through said opening with said driver hatch in the forward downward position.

11. The armored vehicle according to claim 1 wherein said sloping upper surface of said hull forms an angle of approximately 10° to the horizontal.

12. The armored vehicle according to claim 1 wherein said front suspension means includes a bell crank assembly supporting each of said front wheel assemblies, each of said bell crank assemblies including a trailing arm pivotally mounted to said vehicle hull at its forward end and extending rearwardly; means mounting said front wheel assemblies on said trailing arms drivingly supporting said wheel assemblies on said trailing arms, further including a crank arm rotated by each of said trailing arms and further including compression spring means compressed by said crank arms upon rotation of said trailing arms.

13. The armored vehicle according to claim 12 where said compression spring means comprises a pair of substantially horizontally extending coil springs adapted to be compressed by said crank arms.

14. The armored vehicle according to claim 13 wherein each of said compression springs is mounted within said vehicle hull extending into the front nose portion of said enclosed space defined by said vehicle hull.

15. The armored vehicle according to claim 13 wherein said suspension means further includes an axle housing extending between said front wheel assemblies, means mounting a respective front wheel assembly on the outer ends of said axle housing and wherein each of said trailing arms is pivotally mounted to the respective end of said axle housing.

16. The armored vehicle according to claim 15 further including a differential gear unit mounted within said axle housing and a pair of axle shafts extending through said axle housing driven by the output of said differential gear unit and means rotatively connecting said wheel assemblies irrespective of said front wheel assemblies with respective one of said axle shafts whereby said wheel assemblies may be driven, further including drive means driving said differential gear unit by said vehicle power plant.

17. The armored vehicle according to claim 13 wherein said rear suspension means comprises a bell crank assembly supporting each of said rear wheel assemblies, each of said bell crank assemblies including a trailing arm connected to a respective rear wheel assembly mounting structure, further including a crank arm drivingly connected to each of said trailing arms, further including compression spring means creating a force resisting movement of said trailing arms in an upward direction, said trailing arms being pivotally supported on said vehicle hull at a point forward of said wheel assemblies, extending rearwardly towards said rear wheel assemblies.

18. The armored vehicle according to claim 17 further including a rear differential gear unit, means driving said differential gear unit by said vehicle power plant, and means driving each of said rear wheel assemblies with the output of said differential gear unit.

19. The armored vehicle according to claim 2 wherein said vehicle hull is provided with an access opening on the side surface thereof allowing access to said engine power plant.

* * * * *